(12) United States Patent
Li et al.

(10) Patent No.: US 8,081,567 B2
(45) Date of Patent: Dec. 20, 2011

(54) METHOD AND APPARATUS FOR DETECTING WIRELESS DATA SUBSCRIBERS USING NATTED DEVICES

(75) Inventors: Li (Erran) Li, Edison, NJ (US); Tian Bu, Basking Ridge, NJ (US); Scott C. Miller, Freehold, NJ (US); Aiyou Chen, New Providence, NJ (US)

(73) Assignee: Alcatel Lucent, Paris (FR)

( * ) Notice: Subject to any disclaimer, the term of this patent is extended or adjusted under 35 U.S.C. 154(b) by 966 days.

(21) Appl. No.: 12/011,908

(22) Filed: Jan. 30, 2008

(65) Prior Publication Data

US 2009/0190511 A1    Jul. 30, 2009

(51) Int. Cl.
*G08C 15/00* (2006.01)
(52) U.S. Cl. .................. 370/230; 370/310; 709/223
(58) Field of Classification Search .................. 370/310
See application file for complete search history.

(56) References Cited

U.S. PATENT DOCUMENTS

| | | | | |
|---|---|---|---|---|
| 5,905,730 A * | 5/1999 | Yang et al. | | 370/429 |
| 6,263,371 B1 * | 7/2001 | Geagan et al. | | 709/231 |
| 7,447,242 B2 * | 11/2008 | Geagan et al. | | 370/538 |
| 7,711,315 B2 * | 5/2010 | Aaltonen et al. | | 455/3.02 |
| 7,891,001 B1 * | 2/2011 | Greenawalt et al. | | 726/22 |
| 2003/0002856 A1 * | 1/2003 | Kim et al. | | 386/69 |
| 2003/0033421 A1 * | 2/2003 | Haeri et al. | | 709/232 |
| 2004/0174875 A1 * | 9/2004 | Geagan et al. | | 370/389 |
| 2006/0123104 A1 * | 6/2006 | Spinelli et al. | | 709/223 |
| 2007/0129015 A1 * | 6/2007 | Iwamoto et al. | | 455/41.2 |
| 2008/0307081 A1 * | 12/2008 | Dobbins et al. | | 709/223 |
| 2008/0310316 A1 * | 12/2008 | Oran et al. | | 370/252 |

OTHER PUBLICATIONS

Dynamic Application-Layer Protocol Analysis for Network Intrusion Detection, Dreger et al., USENIX Security Symposium, Aug. 2006.

\* cited by examiner

*Primary Examiner* — Bunjob Jaroenchonwanit
(74) *Attorney, Agent, or Firm* — Fay Sharpe LLP

(57) ABSTRACT

A system and method for network based detection of wireless data subscribers using network address translation devices is provided. The method includes identifying a minimum number of devices showing the same internet protocol address. Packet identification sequences may include port numbers or internet protocol identification numbers. The method continues with grouping these applications by their packet identification sequences and applying detection logic where detection logic yields a conclusion that there are multiple host computers when a set of applications appears in a plurality of packet identification sequences. This method is particularly useful when internet protocol addresses are dynamic, as opposed to static. This method overcomes previous embodiments known in the art by being able to account for and work with live traffic, which enables real time detection.

20 Claims, 5 Drawing Sheets

Grouping Table 401

| Application | Sequence | Min. No. of Hosts |
|---|---|---|
| ABC | 301 | 1 |
| DEF | 301, 303 | 2 |
| HIJ | 301, 307 | 1 |
| KLM | 305, 307 | 1 |
| NOP | 301, 303, 305 | 3 |
| QRS | 301 | 1 |
| TUV | 301, 303, 305 | 3 |
| WX | 303, 305 | 2 |
| YZ | 301, 305 | 2 |

Figure 4

METHOD AND APPARATUS FOR DETECTING WIRELESS DATA SUBSCRIBERS USING NATTED DEVICES

BACKGROUND OF THE DISCLOSURE

This disclosure relates to Network Address Translator (NAT) devices. More particularly, this disclosure relates to a method and apparatus that is able to identify the number of host computers behind a NAT device.

While this disclosure is particularly directed towards analyzing traffic associated with NAT hosted computers, in order to accurately determine the number of computers sharing a NAT device, and thus will be described with particular reference thereto, it will be appreciated that the disclosure may have usefulness in other fields and applications. For example, this disclosure may be useful in a variety of services that have a need for reliably identifying subscribers to a carriers' network using live traffic in real-time detection.

By way of background, a NAT device is commonly used in Internet Protocol (IP) translation and mapping technology. These devices are often used to allow users to share internet access with a plurality of devices via one address. Wireless data subscribers may have a service plan that allows them unlimited data access. However, the service plan may restrict the users from sharing the internet access with others. Because a NAT device uses a small number of IP addresses (usually one), but can act as a point of access for many different hosts, there is a particular emphasis for carrier network providers to identify how many host computers are hiding behind a NAT device. Once the number of host computers is identified, the carrier network may find it useful to restrict multiple users from sharing one IP address.

There are a variety of reasons why a carrier network may want to know how many computers are sharing a particular NAT device. One reason is because of limited bandwidth. If many host computers are using only one NAT device, then the service may be slow due to bandwidth restraints. Another reason is because shared access may allow for attacks, where the culprit may be hard to pinpoint. Because a NAT device hides the host computer's IP address, an unauthorized user may launch attacks to websites without being detected.

Reliably detecting NAT devices can be difficult because they are virtually indistinguishable from a host computer. However, there are a few methods known in the art that attempt to correct this problem. One technique is based on observations that, on many operating systems, the IP headers identification field is a simple counter. By suitable processing of trace data, packets emanating from the individual machines may be isolated and thereby allowing a counter to count the number of machines. This technique is described by Steven M. Belovin in his article entitled "A Technique for Counting NATted Hosts", Proceedings of the $2^{nd}$ ACM SIGCOMM Workshop on Internet Measurements, Session 9, pages 267-272, 2002, Marseille, France. This reference is hereby fully incorporated by reference.

This method, however, does have drawbacks. For example, these methods tend to only work when the network addresses are static. When the IP addresses are assigned dynamically to the subscriber every time they connect to the network, the previously mentioned methods tend to fail by generating many false detections of multiple host computers. Moreover, the existing solutions only work offline by analyzing captured network traces. Therefore, real-time detection is not realized.

There is a need in the industry for an apparatus and method that can detect host computers behind a NAT, even when the network addresses are assigned dynamically. Furthermore, there is a need in the industry to detect network activity in real-time through working with live traffic.

The present disclosure contemplates a new and improved system and method which resolves the above-referenced difficulties and others.

SUMMARY OF THE DISCLOSURE

A method and apparatus for detecting wireless data subscribers using NATted devices is provided. The disclosure will allow for network providers to detect subscribers that use NAT devices for a plurality of computers. Network providers may find this useful so that they may take proper action in preventing multiple users from sharing one IP address, e.g., putting them in a different pricing scheme or adding explicit terms in their contracts. By detecting multiple computer sequences, the number of computers behind a NAT device may be determined. This disclosure teaches a detection algorithm which uses header IP fields to count the number of non-overlapping sequences and grouping applications in order to apply detection logic.

In one aspect of the present disclosure, a method for network based detection of wireless data subscribers using NAT devices comprises identifying a minimum number of host computers via analysis of packet identification sequences, grouping applications by their packet identification sequences and applying detection logic where the detection logic yields a conclusion that there are multiple host computers when a set of applications appears in a plurality of identification sequences.

In accordance with another aspect of the present disclosure, the method includes that the IP addresses are dynamic.

In accordance with another aspect of the present disclosure, the method includes that the packet identification sequences are IP identification numbers.

In accordance with another aspect of the present disclosure, the method includes that applications are identified by port numbers.

In accordance with another aspect of the present disclosure, the method includes tracking the start time of the most recent packet arrival for each packet identification sequence.

In accordance with another aspect of the present disclosure, the method includes that the detection logic is applied in real time.

In accordance with another aspect of the present disclosure, the method includes that the identification sequences are corrected for jitter.

In accordance with another aspect of the present disclosure, the method includes that the identification sequences are corrected for wrap around.

In accordance with another aspect of the present disclosure, the method includes that the identification sequences are corrected for missing numbers.

A system for detecting the number of host computers behind a NAT device, using IP packet identification sequences, comprises an extraction module configured to extract internet protocol packets for identification sequence analysis, a separation module adapted to divide applications into groups based on each application's identification sequence, and detection logic that recognizes when the applications are members of a plurality of groups and computes a conclusion on the number of host computers behind a NAT device based at least in part on the applications' groups.

In accordance with another aspect of the present disclosure, the system includes a home agent configured to maintain and manage IP packet traffic.

In accordance with another aspect of the present disclosure, the system includes an array of counters which is configured to calculate the number of non-overlapping identification sequences.

In accordance with another aspect of the present disclosure, the system includes that the identification sequence is a series of IP identification numbers.

In accordance with another aspect of the present disclosure, the system includes that the identification sequence is a series of port numbers.

In accordance with yet another aspect of the present disclosure, a method for detecting the number of host computers behind a NAT device includes tracking the start time and the most recent IP packet arrival time for each packet sequence analyzing each of the packet sequences sent by the same IP address for application overlaps and determining the number of host computers behind a network translation device based at least in part on the number of application overlaps.

DESCRIPTION OF THE DRAWINGS

The presently described embodiments and the construction, arrangement, and combination of the various parts of the device, and steps of the method, whereby the objects contemplated are attained as hereinafter more fully set forth, specifically pointed out in the claims, and illustrated in the accompanying drawings in which:

FIG. 4 illustrates a grouping table showing applications, sequences and a minimum number of hosts.

DETAILED DESCRIPTION

Figure 1:
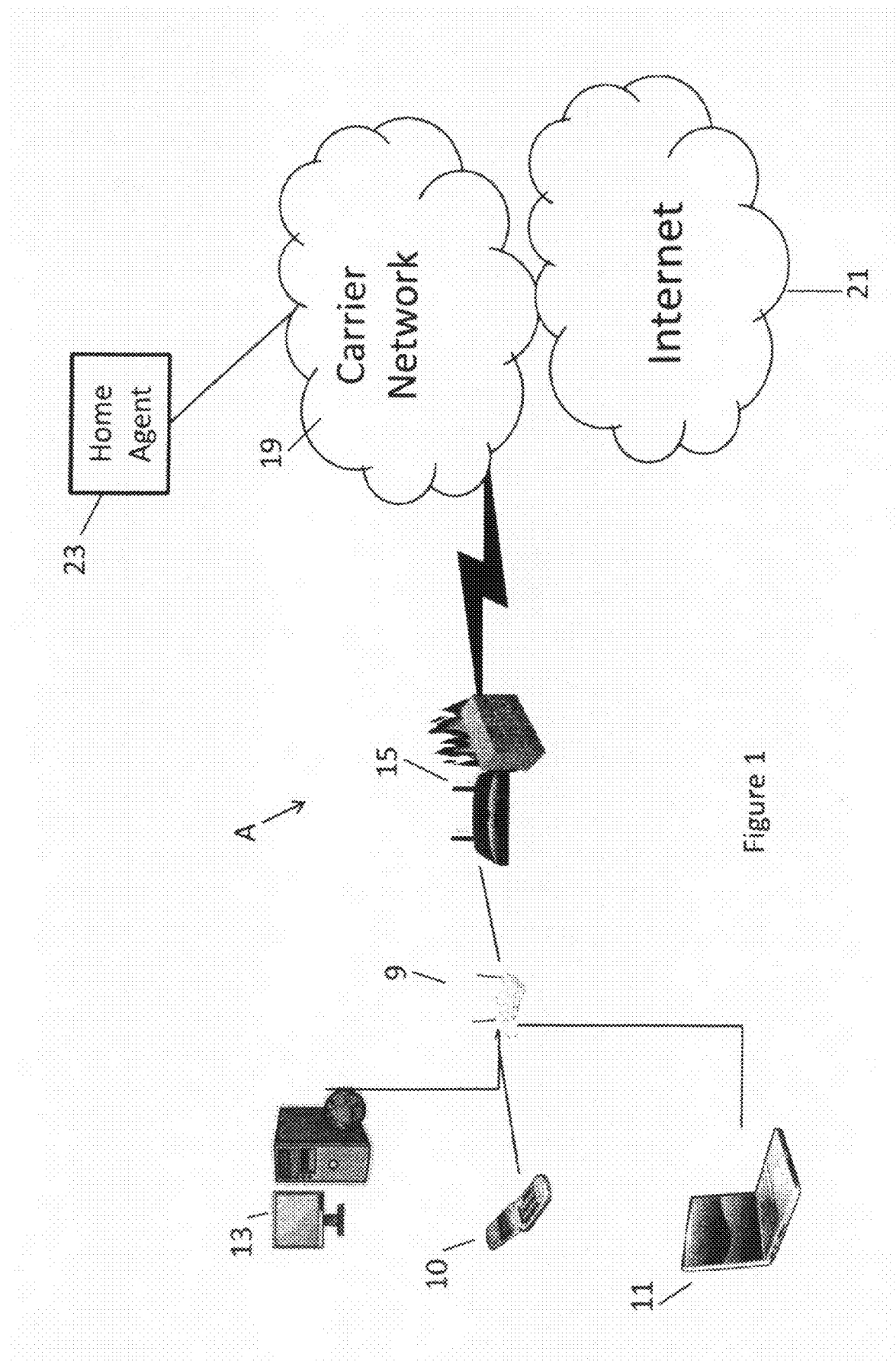
FIG. 1 illustrates a portion of the overall communications network according to the present disclosure.

Referring now to the drawings wherein the showings are for purposes of illustrating the disclosure embodiments only and not for purposes of limiting the claimed subject matter, FIG. 1 provides an overall system into which the present disclosure may be implemented. The system includes a router 9, a host cellular phone 10, a first host computer 11, a second host computer 13, a NAT device 15, the carrier network 19, the internet 21, and the home agent 23. This embodiment could be incorporated in a variety of communication network configurations. FIG. 1 shows merely one embodiment in which the present disclosure may be implemented.

This system includes two host computers 11, 13. The first host computer is shown as a laptop 11, and the second host computer is shown as a desktop 13. Both of these host computers are capable of connecting to the internet through the router 9. The system also includes a cellular phone 10, which may also be capable of connecting through the router 9. It should be appreciated that each of these devices represent but one example of an access terminal. It should be appreciated that other devices besides laptops, desktops and cellular phones may be substituted in order to access the network. For example, a variety of access terminals may be used throughout this disclosure and still fall within the scope of the claims. For example, an access terminal may include a PDA device, a land line telephone, a Voice over Internet Protocol (VoIP) telephone, etc. Practically any device that has the capability of accessing the internet or a web server may act as a host computer. These devices alone, or in conjunction, may be substituted in order to act as a host computer.

A NAT device 15 may support a number of different host computers at any given time. The NAT device 15 is in communication with the router 9, and the carrier network 19. The NAT device is used in order to enable multiple host computers onto a private network 19 which will allow access to the internet 21. It should be noted that the functionality of the NAT device may be in the router 9.

The home agent 23 is in communication with the carrier network 19. A home agent 23 in this embodiment is part of the carrier network 19 infrastructure. The home agent 23 is configured to manage network traffic and may be used in detecting the number of subscribers using NATted devices.

Continuing on with FIG. 1, the host computers 10, 11, and 13 may use the router 9 in order to access the NAT device 15 which will hide the individual IP addresses of the host computers 10, 11, 13. Because the host computers 10, 11, 13 are gaining entry into the carrier network 19 through a NAT device 15, their IP addresses may be hidden from the carrier network 19. Indeed, the carrier network may see all three devices as one device as the devices appear to originate from one address supplied via the NAT device 15. Through this disclosure, these devices can be identified through the carrier network 19 so that a network provider may know how many computers are hidden behind the NAT device 15.

Figure 2:
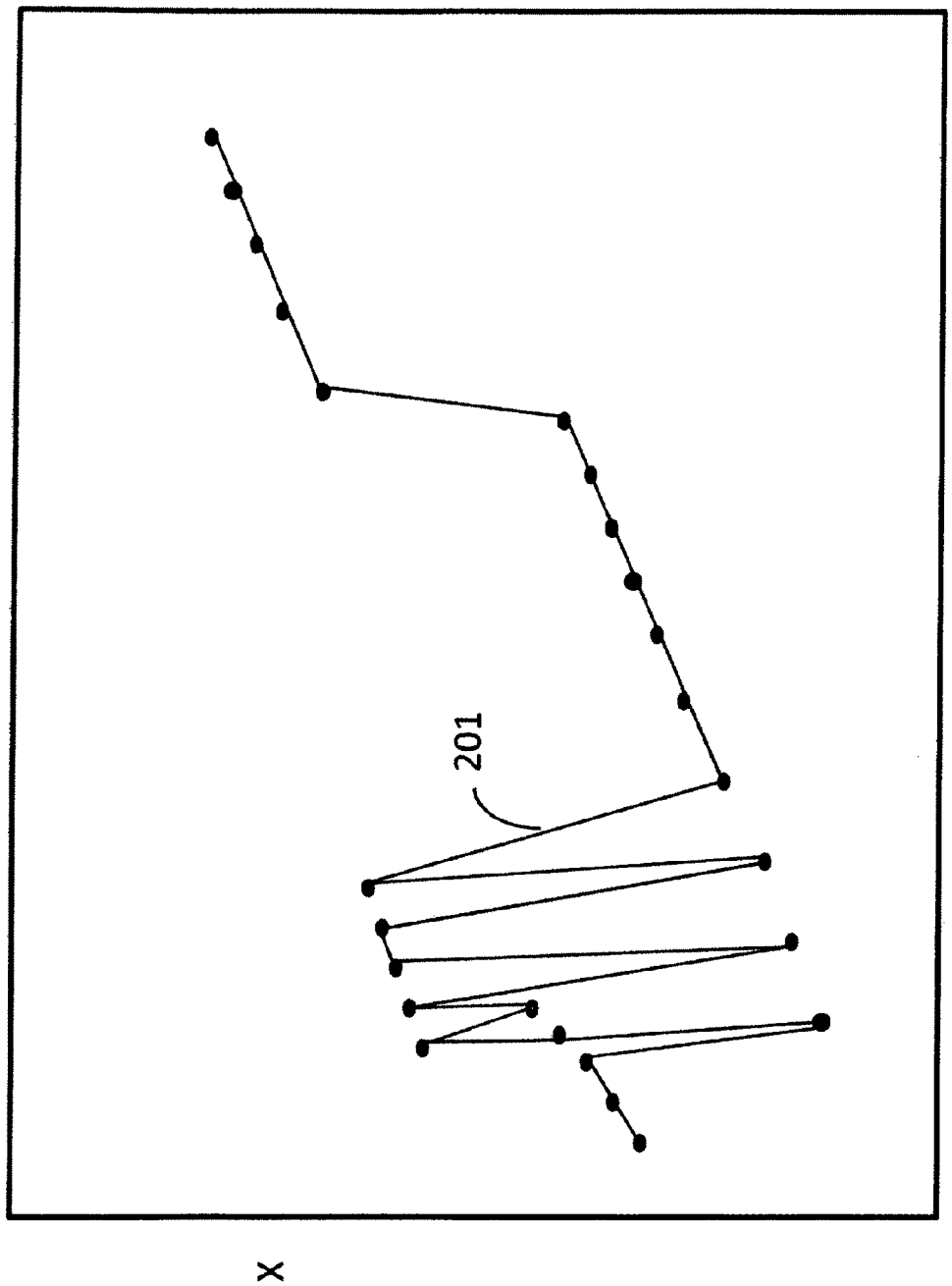
FIG. 2 illustrates raw data packets, graft with the X value being the IP ID value and the Y value being packet arrival time.

Now referring to FIG. 2, which is a sequence showing output data of packet ID sequences. The X axis is a function of time, while the Y axis is IP ID values. It should be noted that this is a simplified illustration including a limited number of data points for exemplary purposes only. Through implementation of this system, many more data points may be accessed in order to implement this disclosure.

This packet identification sequence 201 is shown with respect to time. Time may be measured in minutes, seconds, milliseconds, etc. This is one sequence showing a raw data stream. As noted, the packet ID numbers are generally rising with respect to time. However, as shown, some data points are not rising sequentially.

TABLE 1

Input: A sequence of numbers $x_1, x_2, ...$
    Initiate the buckets with NULL
    initiate counter m = 1
    and add $x_1$ to B[1], i.e. initiate $c_1 = x_1$;
    For t = 2, ···, {
If $x_t \leq \min(c_1, ···c_m)$ {
add $x_t$ as the first number to B[m+1]
update m = m + 1
initiate $c_m = x_t$
}
else {
find $j = \arg\max_{\{k:1 \leq k \leq m, c_k < x_t\}} c_k$
add $x_t$ to B[j]
update $c_j = x_t$
}
}

Shown in Table 1 is an example of a Minimal-increasing Sequence Partition (MISP) algorithm. For illustrative purposes, we assume that out of order and wrap around properties may be ignored. However, the algorithm may be manipulated in order to account for these types of informalities. Through use of the algorithm shown in Table 1, a single sequence may be divided into multiple sequences.

Given a sequence of numbers $x_1 x_2 ...$ we can determine the minimum number of increasing sequences that partition the whole sequence. This algorithm also assumes that the number of hosts is no more than k. Therefore, the idea is to maintain multiple buckets (B[1] . . . B[k]), each of which maintaining an increasing subsequence. Each of these increasing subsequences is targeted for one host. At any given time, $c_k$ is the most recent number of subsequences in B[k].

Figure 3:
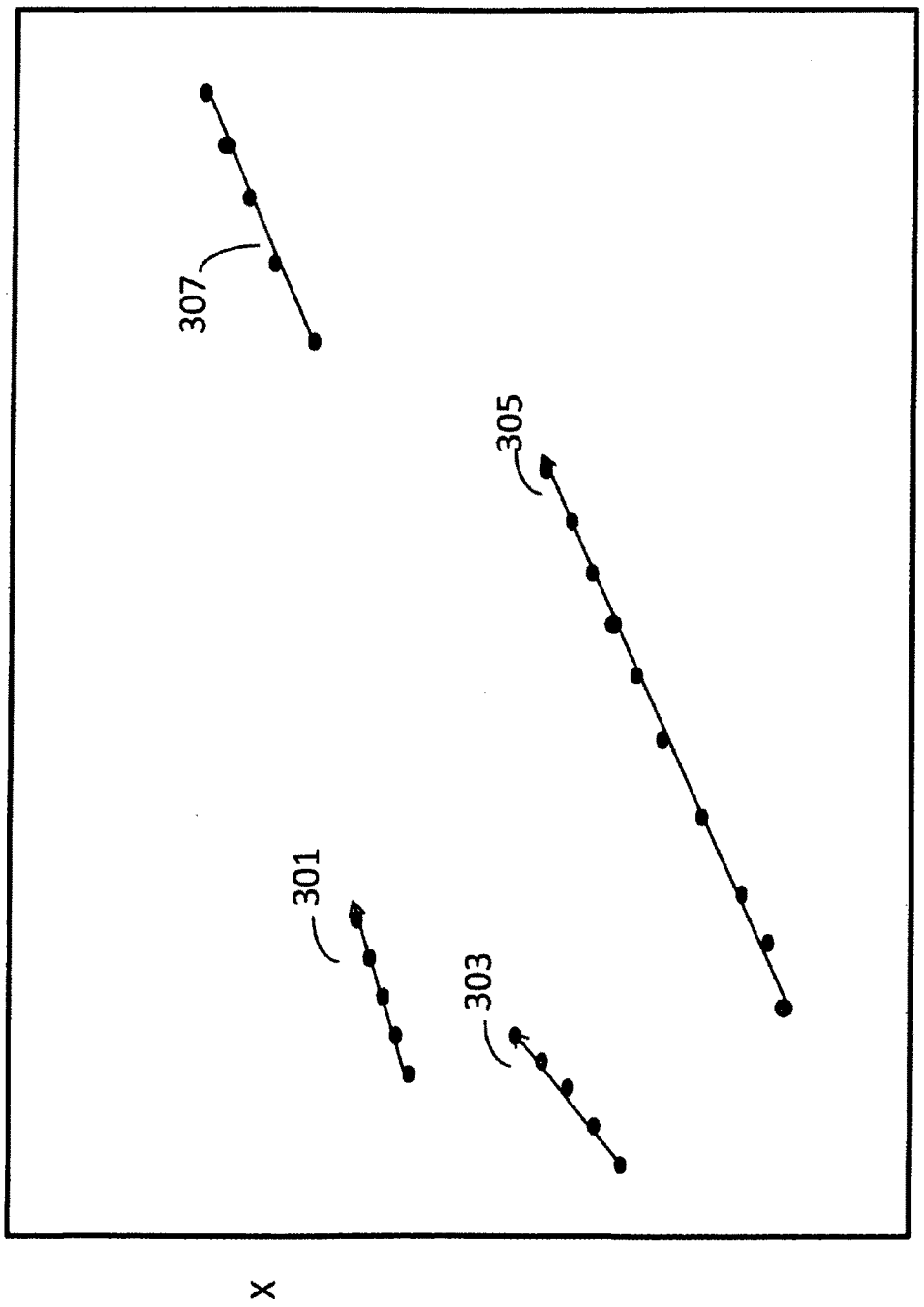
FIG. 3 illustrates the same data as FIG. 2 after processing, illustrating individual packet identification sequences.

Now referring to FIG. 3, the same data as FIG. 2 is provided, however, the output is grouped as three different overlapping sequences, 301, 303, 305 and one non-overlapping sequence, 307, via the MISP algorithm. It should be noted that in each of these sequences, the IP IDs are always rising with respect to time. However, this need not always be the case. In some embodiments, there will be jitter where the packet identification numbers will be out of order. Furthermore, these ID sequences may be wrapped around. For example, IP ID fields are generally numbered from 0 to 65,535 ($2^{16}$-1). Once the IP ID field approaches the top number, the sequence may start over, creating a wrap around effect. There also may be situations where one of the packets was not recorded, creating skipped numbers. The MISP algorithm may be adjusted in order to account for these situations. A refined algorithm shown in Table 2 attempts to ensure that these type of errors are prevented.

TABLE 2

Input: A sequence of numbers $x_1, x_2, ...$
    Initiate the buckets with NULL
    initiate counter m = 1
    and add $x_1$ to B[1], i.e. initiate $c_1 = x_1$;
    For t = 2, ⋯, {
if there exists k, time ($x_t$) – time ($c_k$) < $time_{gap}$ and 0 < $c_k$ $x_t$ <$IPID_{gap}$
skip $x_t$ and continue to next IPID;
if $x_t \leq$ MIN $_{(C1, ..., Cm)}$ {
add $x_t$ as the first number to B[m + 1]
update m = m + 1
initiate $_{Cm} = x_t$
}
else {
find j – arg max{k:1$\leq$k$\leq$m,$c_k$<$x_t$ and time (xt) – time ($c_k$)<timegap}$^c_k$
add $x_t$ to B[j]
update $c_j = x_t$
}
}
Merge adjacent non-overlapping sentences.

Table 2 displays an algorithm that accounts for the specific types of situation listed above such as jitter, skipped numbers, and wrap around. Table 2 shows a Refined MISP (RMISP) algorithm.

The detection logic through this disclosure, on the other hand, will only yield a conclusion that there are multiple host computers when a set of applications appears in the plurality of overlapping identification sequences. Stated another way, when one application appears in sequence 301, 303 and 305, then it is determined that there are three host computers behind the NAT device 15. For example, computer 10 may deliver the 305 sequence, host computer 11 may deliver the 303 sequence and host computer 13 may deliver the 301 sequence because each of these may have an application in common, they will be counted as separate host computers. However, an application's that is in sequence 307 may not be counted as a separate host computer because that sequence does not overlap with any of the other sequences.

Both FIG. 2 and FIG. 3 have the variable X on the Y axis. X may represent internet protocol identification numbers or any other method of tracking these data points. Both of these graphs show X with respect to time.

Now referring to FIG. 4, a grouping table is provided. This table is but one embodiment of how applications may be grouped by their packet identification sequences. The applications are identified by name, however, they may also be identified by other means. For example, the application may also be identified by port number. Applications may also be identified by more sophisticated means as discussed in Holger Dreger, Anja Feldmann, Michael Mai, Vern Paxson, Robin Sommer, Dynamic Application-Layer Protocol Analysis for Network Intrusion Detection, Proc. USENIX Security Symposium, 2006. This reference is herein fully incorporated by reference.

Continuing on with FIG. 4, the grouping table 401 displays the individual applications grouped by their packet identification sequences. As shown, application ABC appears in one sequence 301, meaning that there is at least one host behind the IP address in question. However, application NOP appears in three sequences, 301, 303 and 305. A similar situation exists with application TUV. These two applications show that there is a minimum number of three hosts hidden behind a NAT device. By applying detection logic, the detection logic will yield a conclusion that there are multiple host computers because these applications appear in a plurality of packet identification sequences.

As shown in FIG. 3, sequences 301, 303 and 305 overlap with respect to time. Because these sequences overlap one another, they will generally identify a new host if the applications appear in more than one of these sequences. However, sequence 307 does not overlap with any of the other sequences with respect to time. In this form, an application that appears in sequence 307 will not identify a new subscriber. This is in part because one subscriber may have logged off and logged back on during the non-overlapping unit of time. Therefore, applications that contain non-overlapping sequences do not yield additional subscribers, e.g., applications HIS and KLM.

Figure 5:
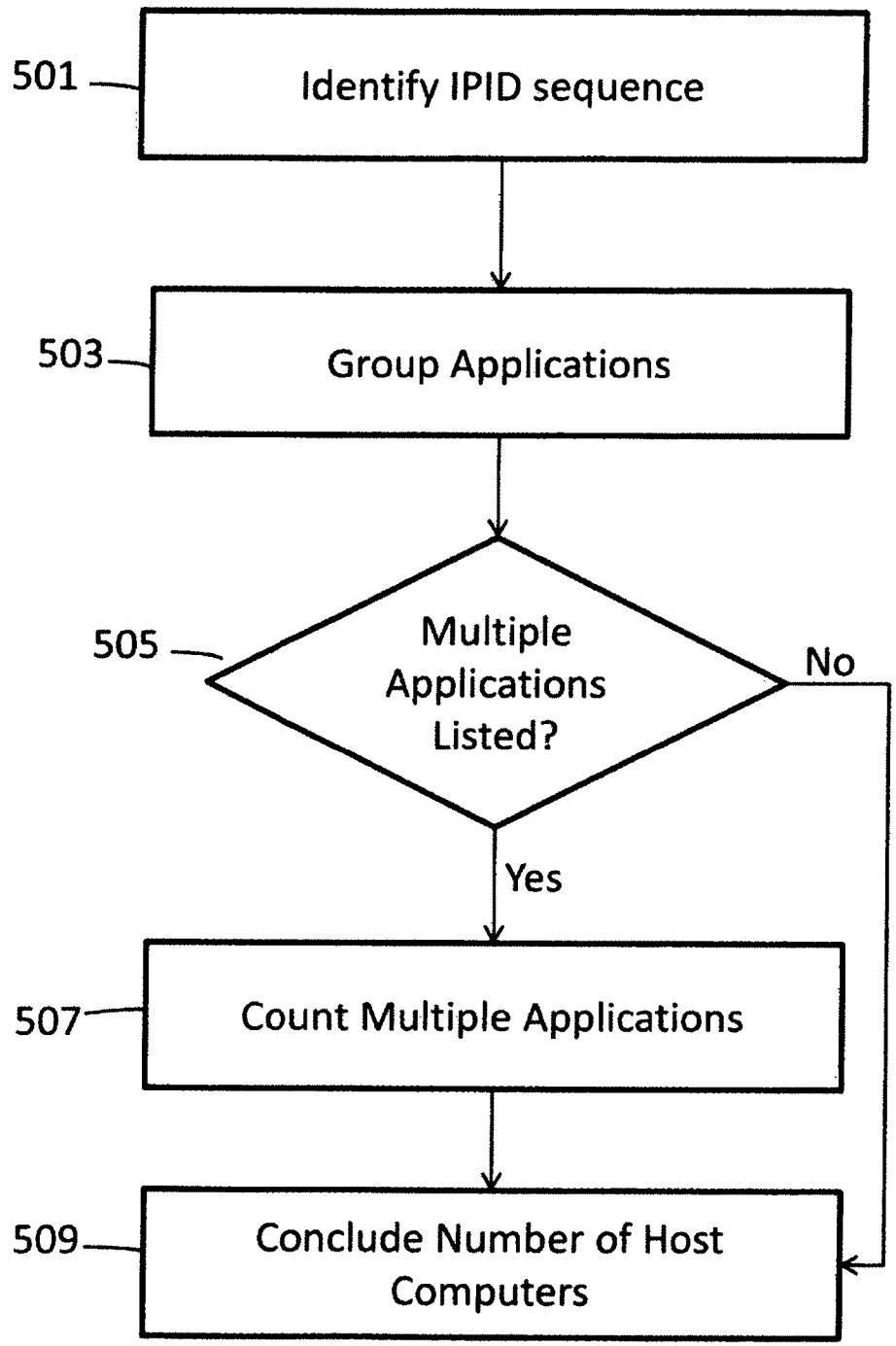
FIG. 5 illustrates a flow chart according to one embodiment of the method according the present disclosure.

Now referring to FIG. 5, a method for detecting the number of host computers behind a NAT device is provided. The method begins with identifying IP ID sequences (at step 501). The sequences may be initially received as shown in FIG. 2 (sequence 201). Through this disclosure, the IP ID sequences may be identified as individual sequences 301, 303, 305, 307 as opposed to sequence 201. Identifying the packet identification sequence may include identifying IP identification numbers in the payload of an IP packet, that is, the inner IP header of an IP encapsulated packet.

The method continues with grouping applications (at step 503). Individual applications, which are run by any given host computer are grouped. The method continues (at step 505) with logic testing to see if multiple applications are listed. If no multiple applications are listed, then generally, we conclude the number of host computers (at step 509).

However, if there are multiple applications listed, then the method continues with counting the number of multiple applications (at step 507). This may include only counting multiple applications where the sequences are overlapping sequences. Furthermore, the applications may be identified by name, port number, etc. . . .

The method concludes (at step 509) with concluding the number of host computers. This conclusion is generally based on the count of multiple applications, if applicable. If the same application appears in multiple overlapping sequences, then we conclude that there are a plurality of host computers behind a NAT device.

The above-described embodiments, as shown in FIG. 5, present but one embodiment of the described disclosure. Implementation of various network elements and steps that they perform depend on how the system is used. These functions may be performed by some or all of the various network elements in conjunction or separate from one another. Furthermore, variations to the network elements and steps of the method may exist. Descriptions of these embodiments are not meant to limit the claims, but instead show how some of the embodiments of the method may be used.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for network based detection of wireless data subscribers that are using a network address translation device, comprising:
    identifying a raw sequence of packet identification numbers at a home agent, the packet identification numbers associated with a data stream through a carrier network, the data stream associated with a select internet protocol address, wherein the home agent is configured to manage network traffic for the carrier network;
    dividing the raw sequence into at least two increasing subsequences of packet identification numbers based at least in part on identifying a different increasing sequence of packet identification numbers for each increasing subsequence;
    determining two or more increasing subsequences overlap in time;
    identifying one or more application associated with each increasing subsequence of at east the two or more increasing subsequences that overlap;
    grouping each identified application with the corresponding increasing subsequence with which the application is associated; and
    determining the select internet protocol address is associated with a network address translation device and that multiple host computers are using the network address translation device when at least one application is grouped with at least two increasing subsequences that overlap.

2. The method according to claim 1, wherein internet protocol addresses are dynamically assigned to subscribers as the subscribers connect to the network and each time the subscribers connect to the network.

3. The method according to claim 1, wherein said packet identification numbers are internet protocol identification numbers.

4. The method according to claim 1, further comprising identifying said applications by port numbers.

5. The method according to claim 1, further comprising tracking a start time of a most recent packet arrival of each said increasing subsequence.

6. The method according to claim 1, wherein determining the select internet protocol address is associated with a network address translation device and that multiple host computers are using the network address translation device is performed in real-time.

7. The method according to claim 1, wherein said increasing subsequences are corrected for jitter.

8. The method according to claim 1 wherein said increasing subsequences are corrected for wrap around.

9. The method according to claim 1, wherein said sequences increasing subsequences are corrected for missing packet identification numbers.

10. The method according to claim 1, further comprising:
    determining a minimum number of host computers that are using the network address translation device based at least in part on the maximum number of increasing subsequences that are overlapping and also grouped with the same application.

11. A system for detecting host computers behind a network address translation device, comprising:
    a home agent configured to manage traffic for a carrier network, the home agent comprising:
        an extraction module configured to extract internet protocol packets from a data stream through the carrier network for identification sequence analysis, the data stream associated with a select internet protocol address;
        a separation module configured to divide applications associated with the internet protocol packets into groups of increasing subsequences of internet protocol packets based upon identification of the application in the corresponding increasing subsequence; and
    a detection logic configured to recognize when a plurality of said increasing subsequences are overlapping in time and grouped with the same identified application and, in response to such recognition, configured to compute a conclusion on the number of host computers behind a network translation device associated with the select internet protocol address based at least in part said increasing subsequences that are overlapping and also grouped with the same application.

12. The system according to claim 11 further comprising a counter configured to count the increasing subsequences.

13. The system according to claim 11 wherein each increasing subsequence is a series of internet protocol identification numbers.

14. The system according to claim 11 wherein said applications are identified by port number.

15. The system according to claim 11 wherein the home agent is further configured to identify a raw sequence of packet identification numbers associated with the data stream, divide the raw sequence into at least two increasing subsequences of packet identification numbers based at least in part on identifying a different increasing sequence of packet identification numbers for each increasing subsequence, determine two or more increasing subsequences overlap in time, identify one or more application associated with each increasing subsequence of at least the two or more increasing subsequences that overlap, and determine a minimum number of host computers that are using the network address translation device based at least in part on the maximum number of increasing subsequences that are overlapping and also grouped with the same application.

16. A method for detecting host computers behind a network address translation device comprising:
    identifying a raw sequence of packet identification numbers at a home agent, the packet identification numbers associated with a data stream through a carrier network, the data stream associated with at least a select internet protocol address, wherein the home agent is configured to manage network traffic for the carrier network;
    dividing the raw sequence into at least two increasing packet sequences of packet identification numbers based at least in part on identifying a different increasing sequence of packet identification numbers for each increasing packet sequence;
    tracking a start time and a most recent internet protocol packet arrival time for each increasing packet sequence;
    determining two or more increasing packet sequences overlap in time;

identifying one or more application associated with each increasing packet sequence of at least the two or more increasing packet sequences that overlap;
analyzing each increasing packet sequence sent by the select internet protocol address for application overlaps;
grouping each identified application with the corresponding increasing packet sequence with which the application is associated;
determining the select internet protocol address is associated with a network address translation device and that multiple host computers are using the network address translation device when at least one application is grouped with at least two increasing packet sequences that overlap; and
determining a minimum number of host computers behind the network translation device based at least in part on the maximum number of increasing packet sequence overlaps that are grouped with the same application.

17. The method according to claim 16, wherein each increasing packet sequence comprises a series of packet identification numbers.

18. The method according to claim 16, wherein said applications are identified by port numbers.

19. The method according to claim 16, wherein internet protocol addresses are dynamically assigned to subscribers as the subscribers connect to the network and each time the subscribers connect to the network.

20. The method according to claim 16, further comprising
identifying a time gap between internet protocol packets exceeds a predetermined time; and
determining a new increasing packet sequence has started in response to identifying the time gap.

* * * * *